United States Patent
Maurer

(10) Patent No.: US 9,616,859 B2
(45) Date of Patent: Apr. 11, 2017

(54) LEVELING METHOD AND SYSTEM WITH LEARN FUNCTION

(71) Applicant: Parker-Hannifin Corporation, Cleveland, OH (US)

(72) Inventor: Garrett Maurer, Maplewood, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/314,051

(22) Filed: Jun. 25, 2014

(65) Prior Publication Data

US 2015/0006027 A1 Jan. 1, 2015

Related U.S. Application Data

(60) Provisional application No. 61/840,172, filed on Jun. 27, 2013.

(51) Int. Cl.
| | |
|---|---|
| *B60S 3/00* | (2006.01) |
| *B60S 9/00* | (2006.01) |
| *B60G 21/00* | (2006.01) |
| *B60S 9/02* | (2006.01) |
| *G05B 15/02* | (2006.01) |

(52) U.S. Cl.
CPC .............. *B60S 9/02* (2013.01); *B60G 21/002* (2013.01); *B60S 9/00* (2013.01); *G05B 15/02* (2013.01)

(58) Field of Classification Search
CPC .......... B60S 9/02; B60G 21/002; G05B 15/02
USPC ..................................................... 701/36, 49
See application file for complete search history.

(56) References Cited

U.S. PATENT DOCUMENTS

| | | | | |
|---|---|---|---|---|
| 5,146,386 A | * | 9/1992 | Learned .................. | H02H 3/023 361/100 |
| 2006/0084308 A1 | * | 4/2006 | Ford ..................... | H01R 13/641 439/188 |
| 2006/0104766 A1 | * | 5/2006 | Ford ......................... | B66F 3/46 414/458 |
| 2009/0138126 A1 | * | 5/2009 | Marsh ....................... | B66F 3/08 700/279 |
| 2010/0025946 A1 | * | 2/2010 | Inoue ..................... | B60G 15/08 280/6.157 |
| 2010/0096819 A1 | * | 4/2010 | Flynn ....................... | B60S 9/02 280/6.153 |
| 2010/0207344 A1 | * | 8/2010 | Nakamura ............. | B60G 13/16 280/124.108 |

(Continued)

FOREIGN PATENT DOCUMENTS

WO   WO2013052540 A2 *  4/2013  .............. H02P 29/00

*Primary Examiner* — Yazan Soofi
(74) *Attorney, Agent, or Firm* — Robert J. Clark

(57) ABSTRACT

A system and method to level a vehicle. The method utilizes a reference current draw unique for each individual actuator that is measured and saved at measured temperature and actuator actuating duration times. The reference current draws are adjusted by a fixed predetermined compensation increment and by a variable predetermined time and temperature increment. During operating function steps, actual extend and retract current draws are measured, which may be at another temperature and duration time. The adjusted reference current draws are compared to the actual extend and retract current draws to determine when desired conditions such as ground contact or fully retracted condition are achieved.

15 Claims, 5 Drawing Sheets

(56) References Cited

U.S. PATENT DOCUMENTS

2010/0230876 A1* 9/2010 Inoue .................... B60G 11/27
267/140.14

* cited by examiner

|  | ACTUATOR 22-25 |
|---|---|
| RETRACT 100% | A |
| EXTEND 100% | B |
| EXTEND 80% | C |
| EXTEND 50% | D |

FIG. 3

|  | A | B | C | D | E | F | G | H | I | J | K | L | M | N |
|---|---|---|---|---|---|---|---|---|---|---|---|---|---|---|
| 1 |  | 0F |  |  |  | 40F |  |  | 70F |  |  |  |  | 120F |
| 2 | 1 SEC |  |  |  |  |  |  |  |  |  |  |  |  |  |
| 3 |  |  |  |  |  |  |  |  |  |  |  |  |  |  |
| 4 |  |  |  |  |  |  |  |  |  |  |  |  |  |  |
| 5 | 12 SEC |  |  |  |  |  |  |  | V |  |  |  |  |  |
| 6 |  |  |  |  |  |  |  |  |  |  |  |  |  |  |
| 7 |  |  |  |  |  |  |  |  |  |  |  |  |  |  |
| 8 |  |  |  |  |  |  |  |  |  |  |  |  |  |  |
| 9 |  |  |  |  |  |  |  |  |  |  |  |  |  |  |
| 10 |  |  |  |  |  |  |  |  |  |  |  |  |  |  |
| 11 | +120 SEC |  |  |  |  |  |  |  |  |  |  |  |  |  |

FIG. 4

LEVELING METHOD AND SYSTEM WITH LEARN FUNCTION

CROSS REFERENCE TO RELATED APPLICATIONS

The present application cross references and claims the benefit of the filing dates of U.S. Provisional Patent Application Ser. No. 61/840,172 filed Jun. 27, 2013; and U.S. Provisional Patent Application Ser. No. 61/542,929 filed Oct. 4, 2011 and U.S. patent application Ser. No. 14/242,070 filed Apr. 1, 2014 based upon PCT/US2012158547 filed Oct. 3, 2012, the disclosures of which are incorporated herein by reference in their entirety. The present application also cross references U.S. Provisional Patent Application Ser. No. 61/778,508 filed Mar. 13, 2013 and U.S. patent application Ser. No. 14/200,423 filed Mar. 7, 2014, the disclosure of which is also incorporated herein by reference in its entirety.

TECHNICAL FIELD

This invention relates generally to electro-hydraulic and electro-mechanical actuator control methods and control systems. More specifically, this invention relates to such electric actuator control methods and systems used with multiple electric actuators to control the attitude of an object.

BACKGROUND OF THE INVENTION

Single or multiple electric actuators frequently use a method and are arranged in a system with a microprocessor based controller that controls electrical current supplied to the electric actuator(s) to control extension and retraction of the actuator(s). The term "electric actuator" means electro-hydraulic actuator and/or electro-mechanical actuator. The term "electro-hydraulic actuator" means a self-contained actuator that converts electrical energy to hydraulic energy and applies the hydraulic energy to cause motion. A typical electro-hydraulic actuator, for example, includes an electric motor that drives a hydraulic pump to pressurize fluid from a reservoir and supply the pressurized fluid to a hydraulic cylinder or other hydraulic motor to cause motion. The term "electro-mechanical actuator" means a self-contained actuator that converts electrical energy to mechanical energy to cause motion. A typical electro-mechanical actuator, for example, includes an electric motor that drives a mechanical rod through a mechanism such as a screw thread to cause motion.

Such methods and systems are used with a wide range of stationary and mobile objects to set and hold the object in a predetermined attitude. The term "attitude" means the orientation or inclination of the axes of the object relative to a plane such as, for example, a horizontal plane or vertical plane. The term "level attitude" means the orientation of the axes of the object in a plane substantially parallel to a horizontal plane.

One example of such method and system is a leveling method and system used with motorized or towed recreational vehicles. Generally, when recreational vehicles are to be parked for an extended period of time, a set of leveling electric actuators is utilized to level and support the vehicle. Once the recreational vehicle is driven to the location where it will be parked, such as, for example, a campground or sporting event, the leveling electric actuators are engaged to position and support the vehicle in a generally level attitude.

In control methods and systems used with single or multiple electric actuators, a technical problem is presented if only some of the electric actuators make ground contact. For example, recreational vehicle or other object leveling systems that use multiple electric actuators to position a vehicle or other object in a level attitude can level the object with only some of the actuators making ground contact. This may occur, for example, if one side of the recreation vehicle is lower relative to ground than the other side of the vehicle. In this example, the electric actuators on the lower side may be extended to lift the lower side and achieve a level attitude for the vehicle while the actuators on the higher side are not making ground contact. If this occurs, even if the vehicle is in a level attitude, the vehicle may sway in a side-to-side direction or shift in a front-to-back direction due to the movement of occupants inside the vehicle or due to wind or other causes.

To address this problem, various methods and systems are disclosed in U.S. Pat. No. 5,143,386, which shows multiple electric actuators mounted on a vehicle to be leveled, an electric controller for extending and retracting the actuators, and electrical current sensors to determine when each actuator is lifting a minimum load. The methods and systems of the general type shown in U.S. Pat. No. 5,143,386 bring the electric actuators to a stop during extension when two conditions are met. These conditions are that each actuator is lifting a minimum load as determined by a preset minimum actuator current draw and that the vehicle has reached a level position as determined by a level sensor. Similar methods and systems of measuring actuator current draw to sense a fully retracted condition may also be used.

A technical problem with respect to sensing ground contact or sensing fully retracted condition or other conditions by measuring current draw is presented by variables in actuator current draw that may not be associated with expected changes in current draw associated with ground contact or full retraction or other desired conditions. For example, while actuators in a system and method may be substantially identical, each will have a different current draw from the other during extension both before ground contact and after ground contact. Also, each individual actuator will itself have variations in current draw from one actuation to another actuation of the same actuator. Further, each actuator will have variations in current drag from one actuation temperature to another and from one actuation duration time to another.

SUMMARY OF THE INVENTION

The present invention provides a method and system for controlling an electric actuator on an object to be moved by the electric actuator relative to ground. The method and system according to one embodiment of the invention measures and stores reference extend and retract current draws that are unique for each individual actuator of the system during an initializing or learn function. The reference current draws are at measured ambient temperature and at measured actuation duration times. Each actuator is then extended or retracted during an operating function such as leveling a vehicle. Actual current draw during the actuator extension or retraction during the operating function is measured, as well as the ambient temperature and actuation duration time at the time of measurement. The actual current draws are compared to the learned reference current draws, with adjustment for a compensation current draw increment and for a time and temperature current draw increment, to determine when ground contact or fully retracted or other conditions are achieved.

According to a second embodiment of the invention, a learn function for initializing an actuator control method and system includes determining and saving a location for each separate actuator of the method and system mounted on an object by sensing level changes of the object during actuation of the actuator. Further, orientation of the level sensor of the method and system is determined by sensing level changes of the object when actuators at known locations are operated.

These and other features of the invention are more fully described and particularly pointed out in the description and claims set out below, and this Summary is not intended to identify all key features or essential features of the claimed subject matter. The following description and claims and the annexed drawings set forth in detail certain illustrative embodiments of the invention, and these embodiments indicate but a few of the various ways in which the principles of the invention may be used.

BRIEF DESCRIPTION OF THE DRAWINGS

Embodiments of this invention will now be described in further detail with reference to the accompanying drawings, in which:

FIG. 3 is a first representative lookup table used with the method and system according to a preferred embodiment of the invention;

FIG. 4 is a second representative lookup table used with the method and system according to a preferred embodiment of the invention;

DETAILED DESCRIPTION OF THE DRAWINGS

Figure 1:
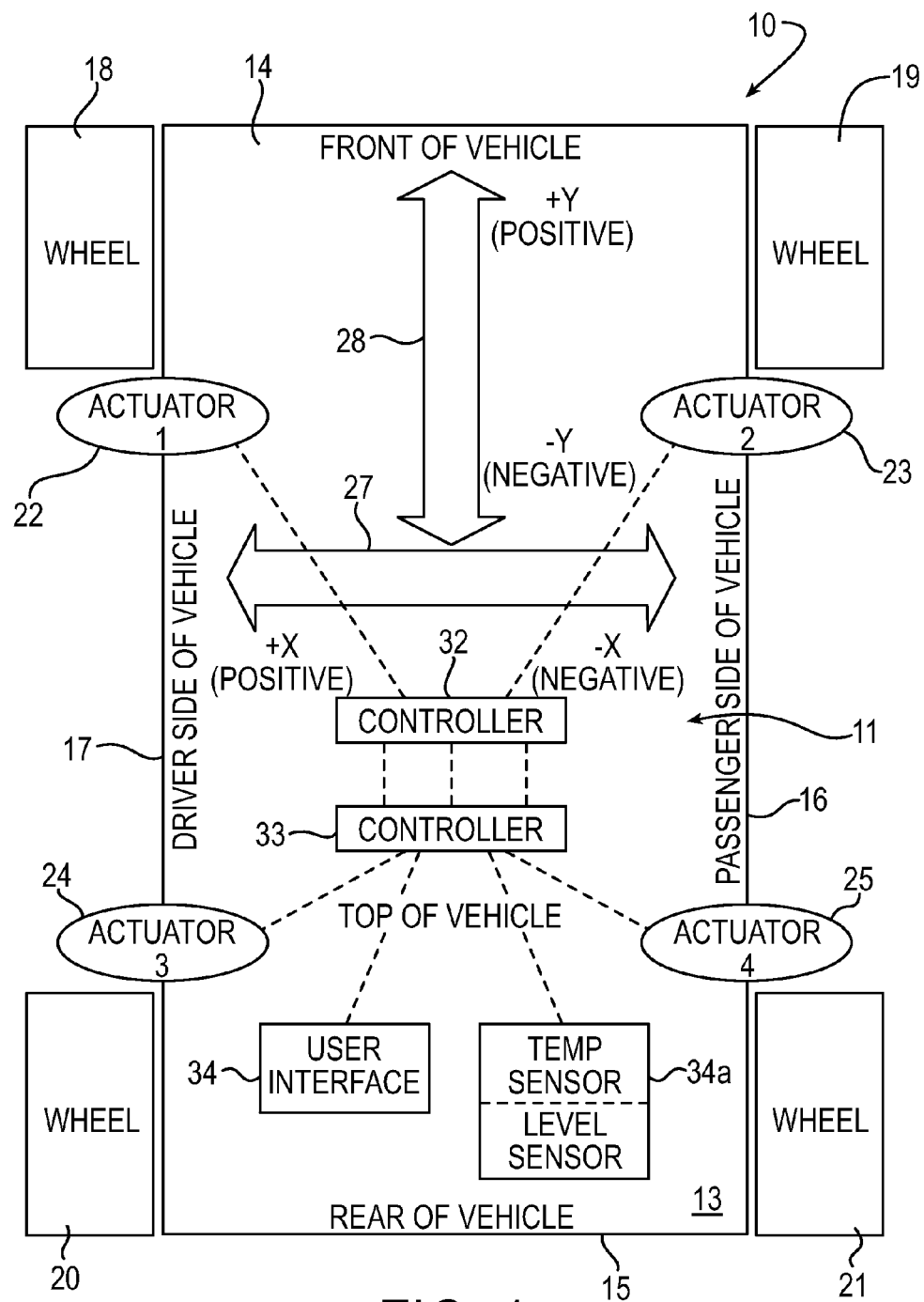
FIG. 1 is a schematic representation of a wheeled land vehicle that includes the method and system according to a preferred embodiment of the present invention, with the vehicle viewed from the top.

Referring now to the drawings in greater detail, FIG. 1 illustrates an object 10 having an electric actuator system 11 that operates according to a method 12, all according to a preferred embodiment of the present invention. The object 10 can be any object that is to be moved with controlled movement, and in the preferred embodiment the object 10 is, for example, a motorized recreational land vehicle 10 that transports humans and cargo on roadways and provides lodging when the vehicle 10 is parked. The electric actuator system 11 can be used in a wide variety of applications to move objects, and in the preferred embodiment the system 11 is, for example, a leveling system for moving the recreational vehicle 10 to a substantially level attitude when the vehicle. 10 is to be parked for an extended period of time. The system 11 and method 12 include a learn or initializing function described further below that is operated to initialize the system 11 and method 12 after installation in the object 10, to enable the system 11 and method 12 to be used in a wide variety of types and configurations of objects 10 without substantial alteration to hardware or programming of the system 11 and method 12.

Still referring to FIG. 1, the vehicle 10 includes a frame and body combination 13, a front 14, a rear 15, a passenger side 16, a driver side 17, and wheels 18-21. The electric actuator system 11 includes electric actuators 22-25 that are each permanently affixed to the frame at any suitable location, such as, for example, near each of the wheels 18-21. The actuators 22-25 are preferably substantially identical to one another, except as otherwise described below. The electric actuators may be of any type, and in the preferred embodiment each actuator 22-25 is, for example, an electro-hydraulic actuator having an integral electric motor, hydraulic pump, and hydraulic cylinder. When electrical power is supplied to the electric motor, the electric motor drives the hydraulic pump to pump hydraulic fluid to one side of the hydraulic cylinder. The hydraulic cylinder of each actuator 22-25 extends a base in a downward direction to engage the ground and raise the vehicle 10, or retracts in an upward direction to lower the vehicle and move away from the ground and fully retract, depending upon the rotation direction of the electric motor and the flow direction of the hydraulic fluid. Electro-hydraulic actuators of this type are well known, and the electric motor, hydraulic pump, and hydraulic cylinder, and base are not shown in the drawings. Other types of electro-hydraulic actuators or electro-mechanical actuators may be used in place of the described actuators 22-25 of the preferred embodiment illustrated in the drawings.

The electric actuator system 11 further includes a first control module or microprocessor based controller 32, a second control module or microprocessor based controller 33, and a user interface 34. The controllers 32 and 33 each include input/output connections described further below. The user interface 34 includes, for example, an LCD screen or other text capable screen for user feedback by the system 11 and control buttons (or a screen that is a touch screen to provide the button functions) to enable user input to the controllers 32 and 33. A level attitude sensor and temperature sensor 34a are also provided. The level sensor may be of any desired type, and in the preferred embodiment the level sensor may be a known three axis accelerometer sensor that permits the level sensor to be mounted in a variety of orientations. The temperature sensor may also be of any desired type. The temperature sensor senses the ambient temperature outside the vehicle, to approximate the temperature of each of the actuators 22-25. Temperature sensors connected to sense the individual operating temperatures of the actuators could alternatively be used, but this additional complexity is typically not cost justified. A battery (not shown) provides electrical power to the system 11. If desired, the controller 33, 33 can be programmed to interface with parking brake and air bag controls or other controls of the vehicle 10, for example, to assure the vehicle parking brake is actuated and the air bags are disabled or that other conditions are met when the leveling system 11 is to be used. Wiring harness connections illustrated in the drawings by dotted lines or boxes with double arrows provide suitable two way electrical connections between these components and the electric actuators 22-25, and certain of these wire harnesses could alternatively be replaced with wireless connections.

The controller 32 is programmed to carry out the method 12 described more fully below to control electric actuators 22 and 23, and controller 33 is programmed in a similar manner to carry out the method 12 to control actuators 24 and 25. The controllers 32 and 33 are substantially identical to one another from a hardware standpoint and are only slightly different in their software programs to accommodate the slightly different functions and connections illustrated and/or described below. The controllers 32 and 33 may alternatively be combined into a single controller.

In some applications for the actuator system 11 it may be desirable to provide more than the four electric actuators 22-25 illustrated in FIG. 1, and in other applications it may be desirable to provide fewer than the four actuators 22-25. For example, in some applications such as relatively large land vehicle trailers known as fifth wheel trailers, the frame of the vehicle might not be as rigid as the frame of the motorized vehicle 10 so that the use of six electric actuators rather than four may be desirable. In other relatively smaller vehicles such as small land trailers, it may be desirable to use only two electric actuators. The system 11 and method 12 according to the present invention allow these changes while using controllers and a user interface that are identical from a hardware standpoint and while using wiring harnesses and electric actuators and temperature sensors and level sensors that are also identical. Further, the system 11 and method 12 according to the present invention use components that may be used in a wide variety of different types of vehicles or other objects.

The system 11 and method 12 according to the preferred embodiment are installed in the vehicle 10 with controller 32 having known connections to actuators 22 and 23 and with controller 33 having known connections to actuators 24 and 25. This can be achieved, for example, by arranging controller 32 with a designated output terminal for each of left front and right front actuators 22 and 23 and by connecting the appropriate actuator 22, 23 to its designated terminal. This would also be done in a similar manner for controller 33 and its associated left rear and right rear actuators 24 and 25. Further, the user interface 34 according to the preferred embodiment is mounted in a known orientation to vehicle 10 and in a known orientation to a horizontal plane, so that upon installation the integrated level sensor 34a knows its attitude and the attitude of vehicle 10 relative to a horizontal plane.

When the system 11 and method 12 are installed in the vehicle 10 in this manner, the present invention provides a system and method having a learn function for initialization (illustrated in FIG. 2 and described below) and an operating function such as leveling or retracting (illustrated in FIG. 5 and described below). While actuators 22-25 are substantially identical, each will have a different current draw from the other during extension before ground contact and after ground contact and during retraction. Also, each individual actuator 22-25 will itself have variations in current draw from one actuation to another actuation of the same actuator. Further, each actuator will have variations in current draw from one operating temperature to another and from one operating duration time to another. Measuring current draw to sense ground contact and measuring current draw to sense a fully retracted condition and other conditions, are improved by a first embodiment of the present invention through zeroing out or compensating for the effects of all of these factors.

Figure 2:
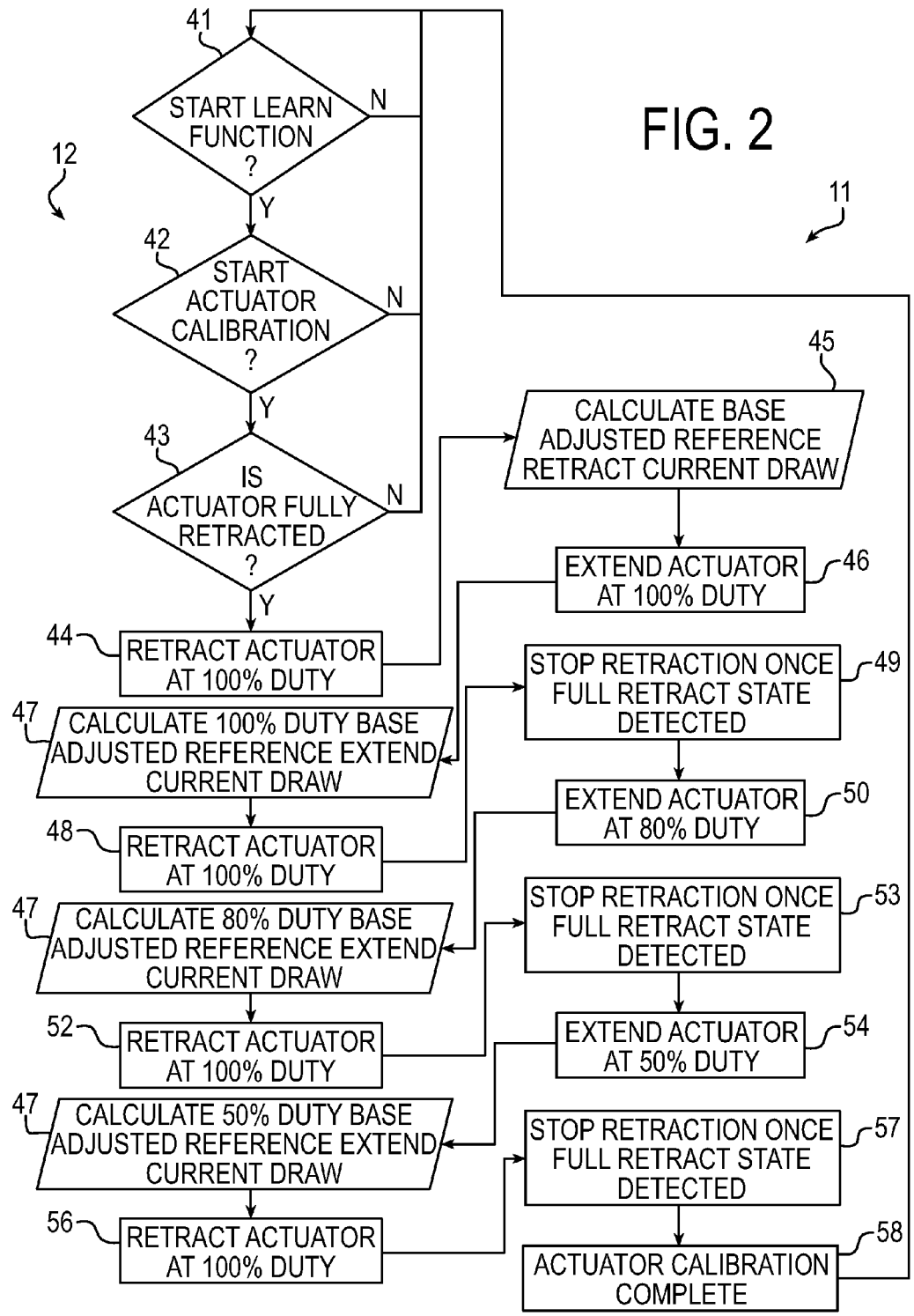
FIG. 2 is a flow chart illustrating a learn portion of the method and system according to a preferred embodiment of the present invention.

As illustrated in FIG. 2, the preferred embodiment of the present invention includes a learn or initializing function that is performed after installation of the system 11 in vehicle 10. The learn function is performed sequentially and separately for each actuator 22-25, but may alternatively be performed for pairs of actuators simultaneously or for all actuators simultaneously in the system 11 with appropriate modifications. The described learn function is performed once after installation for all actuators in the system and may also be performed, for example, after repair in which an actuator is replaced or repaired. The learn function then is not performed during subsequent operations of the method 12 and system 11 to level the vehicle 10. For convenience, definitions of various terms used herein are set out at the end of this Detailed Description.

At step 41, method 12 is started to commence a learn sequence with the actuator to be calibrated or initialized, for example actuator 22, in its retracted position. At step 42, method 12 starts actuator 22 calibration in response to operator command, and at step 43 method 12 verifies that actuator 32 is retracted.

At step 44, controller 32 provides a 100% velocity or 100% duty retract command signal to actuator 22. At step 45, controller 32 calculates and saves a base adjusted fully retracted reference current draw (base $C_{ADJREF-RET}$) for actuator 22. Base $C_{ADJREF-RET}$ is then fixed and used during the remainder of the learn function illustrated in FIG. 2 and during an operating function illustrated in FIG. 5, to determine when actuator 32 is in a fully retracted position.

Base $C_{ADJREF-RET}$ is determined during the learn function by measuring an actual fully retracted reference current draw ($C_{REF-RET}$) and adjusting $C_{REF-RET}$ with a first or compensation increment ($C_{INCREMENT-COMP}$) that compensates for variations within each individual actuator and with a second increment or time and temperature increment ($C_{INCREMENT-TT}$) that accounts for the length of time or duration that actuator 22 was recently actuated or operated at the time of $C_{REF-RET}$ measurement and for the existing ambient temperature at the time of $C_{REF-RET}$ measurement. In this manner, and as further described below, base $C_{ADJREF-RET}$ provides a base adjusted reference retract current draw that can later be compared to real time actual current draws during retraction at different actuator actuation durations and temperatures to verify that actuator 22 is in a fully retracted condition.

The calculation used to determine base $C_{ADJREF-RET}$ according to the preferred embodiment of the invention begins with measured $C_{REF-RET}$, subtracts a predetermined and stored compensation increment current draw $C_{INCREMENT-COMP}$, and subtracts a predetermined and stored time and temperature increment current draw $C_{INCREMENT-TT}$. $C_{INCREMENT-COMP}$ is a preselected current draw increment that is substantially equal to or approximates the maximum variations in current draw that occur from one actuation of an actuator to another actuation of that same actuator. It is a fixed current draw increment and is substantially equal to the difference between maximum and minimum current draw from one actuation to another actuation at a particular velocity and at a given temperature and a given duration time of actuator actuating. When $C_{INCREMENT-COMP}$ is used to adjust $C_{REF-RET}$, a reference adjusted current draw for that specific actuator is determined above which it may be assumed the actuator is in a fully retracted condition at the specific ambient temperature and at the specific time duration at which $C_{REF-RET}$ was measured. $C_{INCREMENT-COMP}$ is stored as a predetermined lookup table in controllers 32, 33, with values determined, for example by bench testing prior to the learn function of actuators similar to actuators 22-25. The $C_{INCREMENT-COMP}$ lookup table can be a XY table similar to that illustrated in FIG. 3, with the horizontal axis indicating specific actuators of the type to which the $C_{INCREMENT-COMP}$ apply and with the vertical axis indicating retract velocity such as, for example, 100%. According to FIG. 3, the $C_{INCREMENT-COMP}$ for actuator 22 is indicated as A amps.

Turning now to current adjustment increment $C_{INCREMENT-TT}$, the current draw of a given actuator will generally decrease with increased ambient temperatures and with increased actuation time duration. For example, actuator 22 operating at 70 degrees Fahrenheit (21 degrees Celsius) will have a lower current draw than the same actuator operating at 40 degrees Fahrenheit (4 degrees Celsius). Further, actuator 22 will have a lower current draw after 12 seconds duration of actuation than after 1 second duration of actuation. Time and temperature adjustment is accomplished at step 44 by measuring the length of time or duration the actuator 22 was recently actuated or operated at the time $C_{REF-RET}$ is measured. If desired, the time can itself be adjusted for increased accuracy by, for example, not including in rush time, measuring after a selected time period has elapsed, and/or averaging $C_{REF-RET}$ over a time period. The predetermined current draw or current adjustment increment $C_{INCREMENT-TT}$ is a variable current draw increment and is substantially equal to the difference between current draw during the actuating at one temperature and one duration time of the actuating at a specific velocity and another temperature and/or duration time of the actuating at that velocity. The temperature sensor 34a provides the temperature at which $C_{REF-RET}$ was measured. A predetermined lookup table is determined such as, for example by bench testing of actuators similar to actuators 22-25 prior to the learn function, and the lookup table is stored in controllers 32 and 33 to provide incremental current draw values $C_{INCREMENT-TT}$. The lookup table can be a XY lookup table such as illustrated in FIG. 4 with, for example, ambient temperatures on the horizontal axis and actuation duration times on the vertical axis. The predetermined incremental current adjustment values $C_{INCREMENT-TT}$ are provided in amps in the table for each time and temperature and can be relative to any selected zero reference duration time and temperature. For example, 120 degrees Fahrenheit (49 degrees Celsius) can be selected as a zero reference temperature so that the incremental current adjustment values are the incremental currents at temperatures lower than that. The incremental current adjustment values $C_{INCREMENT-TT}$ are determined, for example, by bench testing actuators similar to actuators 22-25 before the learn function and are programmed and stored in the controllers 32, 33 as a lookup table. The adjustment can, for example, adjust the measured reference $C_{REF-RET}$ to the preselected zero reference time and temperature to enable comparison of later actual real time retraction current draws discussed below. For example, if $C_{REF-RET}$ is measured at an actuation duration time 12 seconds and temperature 70 degrees Fahrenheit (21 degrees Celsius), that $C_{RET-RET}$ current draw at that time and temperature can be adjusted to the selected zero reference time and temperature current draw by subtracting the incremental value $C_{INCREMENT-TT}$ listed in the table as V amps. In this example, $C_{INCREMENT-TT}$ is zero at the selected zero reference (for example, at 120 degrees Fahrenheit (49 degrees Celsius)), and $C_{INCREMENT-TT}$ at other points on the table provide the predetermined current draw increment that the difference between the retract current draw at such other point and the retract current draw at the zero reference. If actuators 22-25 are not all of the same type, different $C_{INCREMENT-TT}$ lookup tables can be provided for different types of actuators. Once $C_{INCREMENT-COMP}$ and $C_{INCREMENT-TT}$ are subtracted from $C_{REF-RET}$ base $C_{ADJREF-RET}$ is determined. Base $C_{ADJREF-RET}$ then is retained and does not change during the remainder of the learn function and during subsequent operation of the system and method.

At step 46, controller 32 provides a 100% velocity or 100% duty extend command signal to actuator 22. At step 47 controller 32 measures and saves a 100% or full velocity measured extend before ground contact reference current draw (full velocity $C_{REF-EXTBEFOREGC}$) for actuator 22 at the existing ambient temperature and at the then total actuation time duration during the learn function for the actuator 22. $C_{REF-EXTBEFOREGC}$ is retained and does not change during the remainder of the learn function and during subsequent operation of the system and method. At step 47, 100% duty base adjusted reference extend current draw $C_{ADJREF-EXT}$ is calculated as the result of adjusting 100% velocity $C_{REF-EXTBEFOREGC}$ by adding 100% velocity or first predetermined $C_{INCREMENT-COMP}$ and by subtracting $C_{INCREMENT-TT}$. $C_{INCREMENT-COMP}$ for 100% velocity extend is a preselected current draw increment that is or approximates a maxi increase in current draw during extension before ground contact. This increase, for example, may be due to normal variations in current draw that occur from one actuation of an actuator to another actuation of that same actuator. When $C_{INCREMENT-COMP}$ is used to adjust $C_{REF-EXTBEFOREGC}$, a reference current draw for that specific actuator is determined above which it may be assumed the actuator is contacting ground at the specific ambient temperature and at the specific time duration at which $C_{REF-EXTBEFOREGC}$ was measured. $C_{INCREMENT-COMP}$ is stored as a predetermined lookup table in controllers 32, 33, with values determined, for example by bench testing of actuators similar to actuators 22-25. The $C_{INCREMENT-COMP}$ lookup table can be a XY table as illustrated in FIG. 3, with the horizontal axis indicating specific actuators and with the vertical axis indicating extend velocities such as, for example, 100%, 80% and 50%. The values in the $C_{INCREMENT-COMP}$ lookup table are used to adjust 100% duty $C_{REF-BEFOREGC}$; for example by adding B amps from FIG. 3, to yield a reference current draw above which it may be assumed the subject actuator at 100% extend duty achieves ground contact during extension at the measured ambient temperature and actuation duration at which $C_{REF\ BEFOREGC}$ was measured and saved. If desired, $C_{INCREMENT-COMP}$ could alternatively be a value higher than described in this paragraph, which would then indicate a selected minimum load on actuator 22 at the measured ambient temperature and actuation duration at which $C_{REF\ BEFOREGC}$ was measured and saved. $C_{INCREMENT-TT}$ is then used to adjust for time and temperature as described above, and a separate $C_{INCREMENT-TT}$ look up table is provided for 100% velocity extend before ground contact reference current draw because the $C_{INCREMENT-TT}$ values for extension before ground contact will be different from the values of $C_{INCREMENT-TT}$ for retract current draw. In this manner, by using $C_{INCREMENT-COMP}$ and $C_{INCREMENT-TT}$ to adjust 100% velocity $C_{REF-EXT}$, 100% velocity base $C_{ADJREF-EXT}$ can, for example, be calculated so that later 100% velocity extension real time operating current draws at different ambient temperatures and different operating durations can be compared to reference 100% velocity base $C_{ADJREF-EXT}$ to determine when ground contact is achieved.

At step 48, controller 32 provides a 100% velocity retract command signal to actuator 22. At step 49, $C_{ACT-RET}$ is measured and controller 32 determines if fully retracted condition is achieved. To accomplish this, controller 32 measures duration time and ambient temperature at which $C_{ACT-RET}$ is determined. Controller 32 then adds the $C_{INCREMENT-TT}$ for this time and temperature to base $C_{ADJREF-RET}$, to provide a new $C_{ADJREF-RET}$ that is adjusted to the time and temperature at which $C_{ACT-RET}$ is measured. Controller 32 then compares $C_{ACT-RET}$ with new $C_{ADJREF-RET}$, and controller 32 stops retraction once the retract actual current draw $C_{ACT-RET}$ equals or exceeds the new $C_{ADJREF-RET}$. This assures the actuator 22 is fully retracted before step 50 commences.

At step 50, controller 32 provides a first reduced, for example 80% velocity or 80% duty, extend command signal to actuator 22. At step 51 controller 32 measures an 80% velocity measured extend before ground contact reference current draw $C_{REF-EXTBEFOREGC}$ for actuator 22. At step 51, adjusted 80% or reduced velocity extend with ground contact reference current draw base $C_{ADJREF-EXT}$ is calculated. Adjusted 80% or reduced velocity base $C_{ADJREF-EXT}$ is the result of adjusting 80% or reduced velocity $C_{REF-EXTBEFOREGC}$ by adding an 80% or reduced velocity or second predetermined $C_{INCREMENT-COMP}$ (which is C amps from FIG. 3 and is substantially less than 100% velocity or first predetermined $C_{INCREMENT-COMP}$ B amps) and by subtracting 80% velocity $C_{INCREMENT-TT}$ for the measured time and temperature. This 80% velocity $C_{INCREMENT-TT}$ is also substantially less than 100% velocity or first predetermined $C_{INCREMENT-TT}$ for given times and temperatures and is taken from a separate $C_{INCREMENT-TT}$ lookup table that is stored in controllers 32, 33 for 80% duty. This calculation of 80% velocity base $C_{ADJREF-EXT}$ is therefore done in substantially the same manner as described above in connection with determining the 100% velocity $C_{ADJREF-EXT}$. In this manner, 80% velocity base $C_{ADJREF-EXT}$ can, for example, be set at a preselected zero reference time and temperature so that later 80% velocity extension operating current draws can be compared to a new $C_{ADJREF-EXT}$ to determine when ground contact occurs at 80% velocity at then existing time and temperature.

At step 52, controller 32 provides a 100% velocity retract command signal to actuator 22. At step 53, $C_{ACT-RET}$ is measured and controller 32 determines if fully retracted condition is achieved. To accomplish this, controller 32 measures duration time and ambient temperature at which $C_{ACT-RET}$ is determined. Controller 32 then adds the $C_{INCREMENT-TT}$ for this time and temperature to base $C_{ADJREF-RET}$, to provide a new $C_{ADJREF-RET}$ that is adjusted to the time and temperature at which $C_{ACT-RET}$ is measured. Controller 32 then compares $C_{ACT-RET}$ with new $C_{ADJREF-RET}$, and controller 32 stops retraction once the retract actual current draw $C_{ACT-RET}$ equals or exceeds the new $C_{ADJREF-RET}$. This assures the actuator 22 is fully retracted before step 50 commences.

At step 54, controller 32 provides a second reduced, for example 50% velocity or 50% duty, extend command signal to actuator 22. At step 55, controller 32 calculates or determines or measures and saves a 50% velocity measured extend before ground contact reference current draw $C_{REF-EXTBEFOREGC}$ for actuator 22. At step 55, adjusted 50% or second reduced velocity base adjusted reference current draw $C_{ADJREF-EXT}$ is the result of adjusting $C_{REF-EXTBEFOREGC}$ by adding further reduced velocity or 50% or third predetermined $C_{INCREMENT-COMP}$ from the table of FIG. 3 (which is D amps and is substantially less than 100% velocity and 80% $C_{INCREMENT-COMP}$) and by $C_{INCREMENT-TT}$, using $C_{INCREMENT-TT}$ values for 50% velocity extension. This is done in the same manner as described above in connection with determining the 100% and 80% velocity base $C_{ADJREF-EXT}$, but using a $C_{INCREMENT-COMP}$ and $C_{INCREMENT-TT}$ for 50% velocity. In this manner, 50% velocity base $C_{ADJREF-EXT}$ can, for example, be set at a zero reference time and temperature so that later 50% velocity actual extension operating current draws $C_{ACT-EXT}$ can be compared to a new 50% velocity adjusted reference current draw $C_{ADJREF-EXT}$ to determine when ground contact occurs at 50% velocity.

At step 56, controller 32 provides a 100% velocity retract command signal to actuator 22, and at step 57 $C_{ACT-RET}$ is measured and controller 32 determines if fully retracted condition is achieved. To accomplish this, controller 32 measures duration time and ambient temperature at which $C_{ACT-RET}$ is determined. Controller 32 then adds the $C_{INCREMENT-TT}$ for this time and temperature to base $C_{ADJREF-RET}$, to provide a new $C_{ADJREF-RET}$ that is adjusted to the time and temperature at which $C_{ACT-RET}$ is measured. Controller 32 then compares $C_{ACT-RET}$ with new $C_{ADJREF-RET}$, and controller 32 stops retraction once the retract actual current draw $C_{ACT-RET}$ equals or exceeds the new $C_{ADJREF-RET}$. This assures the actuator 22 is fully retracted before step 50 commences.

In this manner, the learn function described above for the method 12 and system 11 measures and saves by operation of controllers 32, 33 for each actuator 22-25 a measured actual fully retracted reference current draw ($C_{REF-RET}$), a measured full velocity actual extend before ground contact reference current draw (full velocity $C_{REF-EXTBEFOREGC}$), and at least one measured reduced velocity actual extend before ground contact reference current draw (reduced velocity $C_{REF-EXTBEFOREGC}$). These current draws are all determined at the ambient temperature existing at the time the learn function is performed and after the actuator has been operating for a measured amount of time. These current draws are then adjusted using the described $C_{INCREMENT-COMP}$ and $C_{INCREMENT-TT}$ to yield base $C_{ADJREF-RET}$ and base $C_{ADJREF-EXT}$. After the learn function is performed, base $C_{ADJREF-RET}$ and base $C_{ADJREF-EXT}$, which are unique to each individual actuator, are used during operation of the method 12 and system 11.

Figure 5:
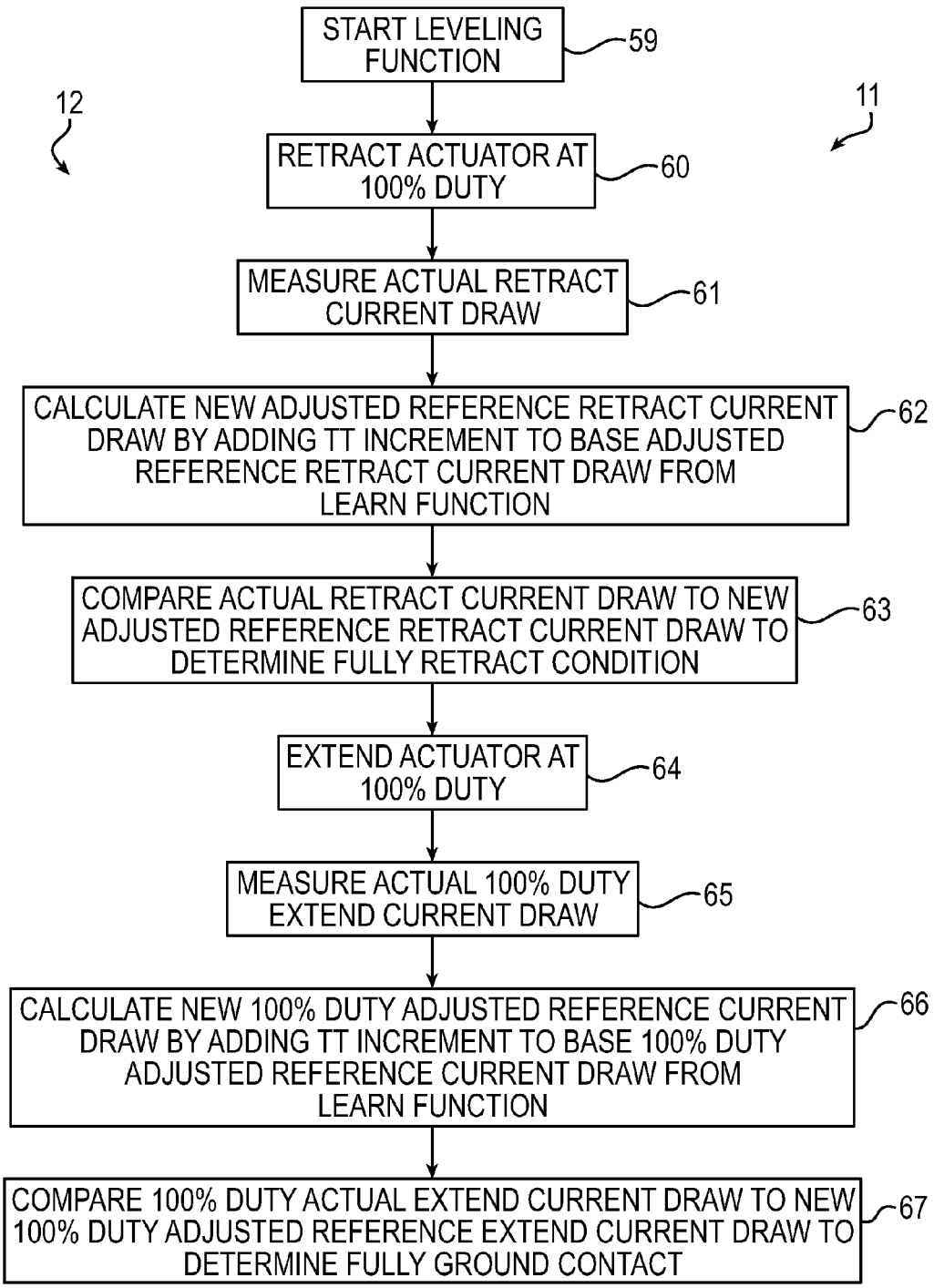
FIG. 5 is flow chart illustrating an operating portion of the method and system according to a preferred embodiment of the present invention.

The system 11 and method 12 next preferably operate according to FIG. 5 for auto or manual leveling, auto or manual retract, or other operating functions. Referring to FIG. 5, a leveling or other function is started at step 59. At step 60, controller 32 provides a 100% velocity retract command signal to actuator 22, and at step 61 $C_{ACT-RET}$ is measured. At step 62, controller 32 measures duration time and ambient temperature at which $C_{ACT-RET}$ is determined. Controller 32 then adds the $C_{INCREMENT-TT}$ for this time and temperature to base $C_{ADJREF-RET}$, to provide new $C_{ADJREF-RET}$ that is adjusted to the time and temperature at which $C_{ACT-RET}$ is measured. At step 63, controller 32 then compares $C_{ACT-RET}$ with new $C_{ADJREF-RET}$, and controller 32 stops retraction once the retract actual current draw $C_{ACT-RET}$ equals or exceeds the new $C_{ADJREF-RET}$. This assures the actuator 22 is fully retracted before step 64 commences. At step 65, controller 32 commands a 100% duty actuator extension. At step 66, controller 32 measures $C_{ACT-EXT}$ and has counted or determined the actuation duration time for actuator 22 and receives the ambient temperature from temperature sensor 34a. Based upon the actuation duration time and the ambient temperature, controller 32 selects a 100% duty $C_{INCREMENT-TT}$ from the appropriate stored 100% duty lookup table and adds that $C_{INCREMENT-TT}$ to stored 100% duty base $C_{ADJREF-EXT}$ for actuator 22 to yield 100% duty new $C_{ADJREF-EXT}$ for actuator 22 at that time and temperature. At step 67, controller 32 compares 100% duty new $C_{ADJREF-EXT}$ to $C_{ACT-EXT}$ and determines ground contact when $C_{ACT-EXT}$ equals or exceeds new $C_{ADJREF-EXT}$.

Various modifications of the preferred embodiment may also be made. For example, while the preferred embodiment adjusts reference current draws $C_{REF-EXTBEFOREGC}$ and $C_{REF-RET}$ based upon a compensation increment $C_{INCREMENT-COMP}$ and a time and temperature increment $C_{INCREMENT-TT}$, those increments could alternatively be applied in a similar manner to the actual extend current draws $C_{ACT-EXT}$ or to the actual retract current draws $C_{ACT-RET}$ to provide similar results. Further, when an application of an equation in the general format X=Y+Z is described, such description includes X−Y=Z, X−Z=Y, X−Y−Z=0 and similar derivative equations. Further, compensation increment $C_{INCREMENT-COMP}$ and time and temperature increment $C_{INCREMENT-TT}$ can be added to or subtracted from $C_{REF-EXTBEFOREGC}$ and $C_{REF-RET}$ to provide various other results. Further, the method and system according to the invention can be used to detect other conditions, such as, for example, end of stroke of an actuator during extension. Further, while the preferred embodiment includes calculating both a base $C_{ADJREF-EXT}$ or $C_{ADJREF-RET}$ (which are based upon $C_{INCREMENT-TT}$ when $C_{REF-EXT}$ or $C_{REF-RET}$ are measured) and a new $C_{ADJREF-EXT}$ or $C_{ADJREF-RET}$ (which are based upon $C_{INCREMENT-TT}$ when $C_{ACT-EXT}$ or $C_{ACT-EXT}$ are measured), alternatively only a single $C_{ADJREF-EXT\ OR}C_{ADJREF-RET}$ may be calculated based upon the difference between $C_{INCREMENT-TT}$ when $C_{REF-EXT\ OR}\ C_{REF-RET}$ are measured and $C_{INCREMENT-TT}$ when $C_{ACT-EXT\ OR}\ C_{ACT-RET}$ are measured.

Figure 6:
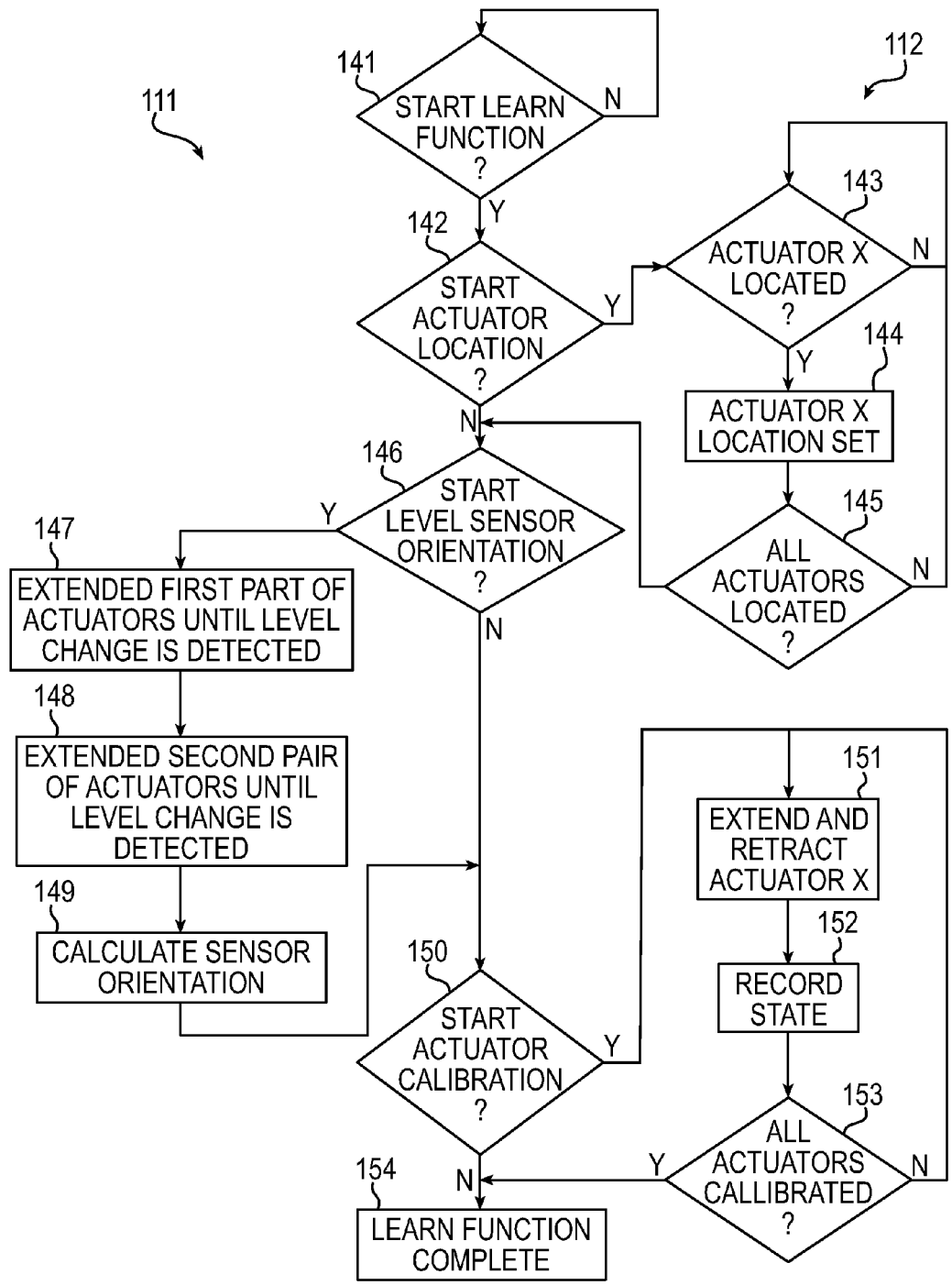
FIG. 6 is a flow chart illustrating the method and system according to an alternate embodiment of the present invention.

An additional alternate embodiment of the learn function portion of a system 111 and method 112 according to the invention is illustrated in FIG. 6. When the FIG. 6 embodiment is used, the components of vehicle 10 may be substantially the same as those used with the FIG. 2 embodiment except as otherwise described. When the system 111 and method 112 are first installed in the vehicle 10, the alternate embodiment provides a learn function for initialization that may be used in part or in whole in place of or in addition to the learn function steps illustrated in FIG. 2 and described above. Additionally, the system 111 and method 112 may be used with the operating function illustrated in FIG. 5.

When the system 111 and method 112 are first installed in vehicle 10, the controller 32 is electrically connected to actuators 22 and 23. However, the controller 32 used with the second embodiment does not have designated right side and left side terminals and therefore does not know which actuator 22 or 23 is on the driver side and which is on the passenger side. Similarly when controller 33 is first electrically connected to actuators 24 and 25, controller 33 does not have designated right side and left side terminals and does not know which actuator 24 or 25 is on the driver side and which is on the passenger side. Also, when user interface 34 with an integrated level sensor is first installed, user interface 34 does not have a known orientation relative to a horizontal plane and relative to vehicle 10 but instead can be installed in any of many configurations. Therefore, user interface 34 and its integrated level sensor does not know its installed configuration or what is a level attitude for the object 10 on which it is installed.

As illustrated in FIG. 6, a learn function is performed after installation in vehicle 10. At step 141, method 121 is started to commence a learn sequence with the actuators 22 and 23 in their retracted positions. Controller 32 at step 142 provides an extend signal to one of its actuators 22 or 23 without knowing which actuator the extend signal is being sent to. As the unknown actuator begins to change the attitude of vehicle 10, level sensor 34 senses what corner of vehicle 10 is beginning to raise and communicates to controller 32 the identity and location of the signaled actuator at step 143. Controller 32 then stores this identity and location at step 144 and retracts the signaled and identified actuator. Controller 32 at step 145 then determines if all actuators are located. If not, controller 32 then provides an extend signal at step 142 to the other of its actuators 22 or 23 to repeat steps 142-144. Again, as the signaled actuator begins to change the attitude of vehicle 10 level sensor 34 senses what corner of vehicle 10 is beginning to raise and communicates to controller 32 at step 143 the identity of the second signaled actuator. Controller 32 then stores or sets this location at step 144 and retracts the signaled and identified actuator. Controller 33 then performs the same sequence of steps 142-143 with respect to its actuators 24 and 25 as described in connection with controller 32, so that controller 33 also locates each of its associated actuators. After actuators 22-25 are located and stored, method 121 at step 145 determines that all actuators have been located and a yes answer exits the actuator identification and location portion of the learn function.

The learn function at step 146 then begins to initialize the level sensor of user interface 34 to determine how the axes of the level sensor are oriented relative to the axes of the object based upon sensed changes in attitude of the level sensor caused by extension of more than one of the actuators 22-25. With actuators 22-25 retracted and vehicle 10 in a level attitude determined for example by an auxiliary or calibration level sensor (not shown), first pair of actuators 22-23 are extended at step 147 until sensor 34 detects a level change in the Y direction. Then, at step 148 second pair of actuators 24-25 are extended until sensor 34 detects another level change in the X direction. Controllers 32 and 33 and level sensor 34 at step 149 then calculate level sensor orientation relative to object 10 based upon inputs received at the level change detection in the X and Y direction and store such orientation at step 149, completing initializing of level sensor 34.

The learn function at step 150 then begins to initialize or calibrate each actuator 22-25 to determine its ground contact current draw. At steps 151-152, learn function steps as illustrated in FIG. 2 and described above are performed. At step 153, loop 151-152 is repeated by controller 32 for actuator 23. Loop 51-52 is then repeated by controller 33 for actuators 24-25. After this has been completed for all actuators 22-25, controllers 32 and 33 know the actual extend before ground contact base adjusted reference current draw $C_{ADJREF-EXT}$ for each of theft associated actuators and the method 112 proceeds to step 154 to complete the learn function. The system 111 and method 112 may determine and store current draw for full retract and for various extension speeds for each actuator 22-25 in the manner described above in connection with system 11 and method 12. The system 111 and method 112 then operate in the manner described above in connection with FIG. 5, to level the vehicle 10.

Various terms have been used above, and definitions of certain of those terms are set out below for convenience. The term "measured extend before ground contact reference current draw" (herein "$C_{REF-EXTBEFOREGC}$"), means a measured reference current draw for a specific actuator during extension and before ground contact. It is measured in various embodiments of the present invention during a learn or initializing function and thereafter does not change. It is determined for the actuator at a specific ambient temperature and at a specific time duration during which the actuator has been actuated.

The term "incremental compensator current draw" (herein "$C_{INCREMENT-COMP}$") means a preselected current draw increment that is or approximates a maximum increase or range variable in current draw, due to variables such as normal variations in current draw that occur from one actuation of an actuator to another actuation of that same actuator. $C_{INCREMENT-COMP}$ may be determined by bench testing of one or more actuators similar to the actuators used in the method and system and stored such as in the system controller prior to the learn function. It may be determined for actuator extend or for actuator retract or for both. When $C_{INCREMENT-COMP}$ is added to $C_{REF-EXTBEFOREGC}$, a reference current draw for that specific actuator is determined above which it may be assumed the actuator is contacting ground during extension at the specific ambient temperature and at the specific time duration of actuator actuation at which $C_{REF-EXTBEFOREGC}$ was measured. The term "incremental time and temperature current draw" (herein "$C_{INCREMENT-TT}$") means a preselected current draw increment that is or approximates the change in current draw from one temperature to another and from one actuator actuation time duration to another. $C_{INCREMENT-TT}$ may be determined by bench testing of one or more actuators similar to the actuators used in the method and system and stored such as in the system controller as a lookup table prior to the learn function. $C_{INCREMENT-TT}$ provides an incremental current draw that adjusts and allows reference extend current draw $C_{REF-EXTBEFOREGC}$ and reference retract current draw $C_{REF-RET}$ from one actuation time duration and temperature to be compared to actual extend and retract current draws, respectively, at other actuation time durations and temperatures. The term "base adjusted extend with ground contact reference current draw" (herein "$C_{ADJREF-EXT}$") is the result of adjusting $C_{REF-EXTBEFOREGC}$ by both $C_{INCREMENT-COMP}$ and by $C_{INCREMENT-TT}$. $C_{ADJREF-EXT}$ is a hybrid of a measured and saved extend before ground contact reference current draw $C_{REF-EXTBEFOREGC}$ for each separate actuator (which is measured during a learn function and fixed) and preselected and stored incremental current draw values $C_{INCREMENT-COMP}$ and $C_{INCREMENT-TT}$.

The term "actual extend current draw" ("$C_{ACT-EXT}$") is the actual real time measured current draw for a specific actuator of the method and system after the learn or initializing function, measured during extension during operation of the system and method, for example to level a vehicle, at a specific actuator actuation duration time and a specific ambient temperature. When a $C_{INCREMENT-TT}$ is applied to base $C_{ADJREF-EXT}$, a new $C_{ADJREF-EXT}$ for the time and temperature of $C_{ACT-EXT}$ is determined. If $C_{ACT-EXT}$ is equal to or greater than new $C_{ADJREF-EXT}$, then ground contact is assumed. As illustrated in U.S. patent application Ser. No. 14/200,423, the separate actuators of the method and system may be operated at commanded full velocity or at commanded reduced velocity, and one or more actuators may be operated at full velocity while others are operated at reduced velocity. According to various embodiments of the invention, $C_{REF-EXTBEFOREGC}$ may be at commanded full extension velocity ("full velocity $C_{REF-EXTBEFOREGC}$") or at commanded reduced extension velocity ("reduced velocity $C_{REF-EXTBEFOREGC}$"). $C_{INCREMENT-TT}$ may also be at commanded full extension velocity ("full velocity $C_{INCREMENT-TT}$") or at commanded reduced extension velocity ("reduced velocity $C_{INCREMENT-TT}$"). Full velocity $C_{REF-EXTBEFOREGC}$ is adjusted by full velocity $C_{INCREMENT-TT}$, and reduced velocity $C_{REF-EXTBEFOREGC}$ is adjusted by reduced velocity $C_{INCREMENT-TT}$.

The term "fully retracted reference current draw" (herein "$C_{REF-RET}$") means the measured and saved reference current draw for a specific actuator after the actuator is in a fully retracted condition. It is measured in various embodiments of the present invention during a learn or initializing function. The term "base adjusted fully retracted reference current draw" (herein "base $C_{ADJREF-RET}$") is the result of adjusting $C_{REF-RET}$ by incremental time and temperature current draws $C_{INCREMENT-TT}$ for the time and temperature at which $C_{REF-RET}$ was measured and by incremental compensation current draws $C_{INCREMENT-COMP}$ in a manner similar but not identical to that described above with respect to actuator extension. Base $C_{ADJREF-RET}$ is a hybrid of a measured and saved fully retracted reference current draw $C_{REF-RET}$ for each separate actuator determined during the learn function and preselected and stored incremental time and temperature current draw values $C_{INCREMENT-TT}$ and variables compensation incremental current draws $C_{INCREMENT-COMP}$. Values of $C_{INCREMENT-TT}$ and/or $C_{INCREMENT-COMP}$ during retraction operation may be the same or different from values of $C_{INCREMENT-TT}$ and $C_{INCREMENT-COMP}$, respectively, during extension and may be stored in separate lookup tables or in the same lookup tables.

The term "actual retracted current draw" ("$C_{ACT-RET}$") is the actual real time measured current draw for a specific actuator during retraction after initializing, measured during operation of the system and method at a specific actuator actuation duration time and temperature. Base $C_{ADJREF-RET}$ and $C_{INCREMENT-TT}$ for the time and temperature of $C_{ACT-RET}$ are added to yield new $C_{ADJREF-RET}$. In the preferred embodiment, $C_{ACT-RET}$ is compared to new $C_{ADJREF-RET}$ to determine when a specific actuator has achieved full retraction. New $C_{ADJREF-RET}$ and $C_{ACT-RET}$ are usually determined and compared at full velocity retract but may alternatively be used at reduced velocity retract in a manner similar to that discussed above with respect to actuator extension velocities.

Although the principles, embodiments and operation of the present invention have been described in detail herein, this is not to be construed as being limited to the particular illustrative forms disclosed. For example, the various steps of embodiments described herein may be changed in order. Also, other functions may be included in the learn function, to calibrate or initialize a system and method of electric actuators for any of a wide variety of platforms, structures, vehicles or other objects according to the present invention. Further, the system and method can be applied to vehicles with numbers of actuators other than four. It will thus become apparent to those skilled in the art that various modifications of the embodiments herein can be made without departing from the spirit or scope of the invention.

The invention claimed is:

1. A method for controlling an electric actuator on an object to be moved by the electric actuator relative to ground, comprising the steps:
   providing an electric controller having electric communication with the electric actuator;
   storing a predetermined current draw increment;
   actuating the actuator by operation of the electric controller during an initializing function after storing the predetermined current draw increment;
   measuring the current draw of the actuator during the actuating during the initializing function;
   actuating the actuator during an operating function after the initializing function;
   measuring the current draw of the actuator during the actuating during the operating function;
   comparing the current draw of the actuator measured during the operating function with the current draw of the actuator measured during the initializing function;
   adjusting the comparison by the amount of the predetermined current draw increment; and using the comparison to determine when the actuator during the operating function achieves a specified condition.

2. The method as set forth in claim 1, including storing the actuating current draw measured during the initializing function.

3. The method as set forth in claim 1, wherein the actuating during the initializing function and during the operating function includes actuating the actuator at a first actuating velocity;

and the measuring during the initializing function and during the operating function includes measuring at the first actuating velocity.

4. The method as set forth in claim 3, wherein the adjusting includes adjusting the current draw of the actuator measured during the initializing function at the first velocity by the amount of the first predetermined current draw increment.

5. The method as set forth in claim 3, wherein the predetermined current draw increment is substantially equal to the difference between maximum and minimum current draw during actuating the actuator at the first predetermined velocity at a given temperature and a given duration time of actuator actuating.

6. The method as set forth in claim 3, wherein the predetermined current draw increment is substantially equal to the difference between current draw during the actuating at one temperature and one duration time of the actuating at the first velocity and another temperature and/or duration time of the actuating at the first velocity.

7. The method as set forth in claim 6, including storing prior to the initializing function a plurality of current draw increments for a plurality of temperatures and a plurality of duration times of the actuator actuating at the first velocity; and the adjusting includes selecting a specific current draw increment from the plurality of current draw increments.

8. The method as set forth in claim 7, wherein the plurality of predetermined current draw increments is stored in the controller as a lookup table having a plurality of current draw increments for a plurality of temperatures and a plurality of duration times of the actuator actuating at the first velocity.

9. The method as set forth in claim 3, wherein the actuating during the initializing function further includes actuating the actuator at a second velocity less than the first velocity;

the actuating the actuator during the operating function further includes actuating the actuator at the second velocity;

the measuring the current draw of the actuator during the actuating during the initializing function further includes measuring such current draw at the second velocity;

the measuring the current draw of the actuator during the actuating during the operating function further includes measuring such current draw at the second velocity;

the comparing further includes comparing the current draw of the actuator measured during the operating function at the second velocity with the current draw of the actuator measured during the initializing function at the second velocity;

the adjusting further includes adjusting the comparison of the current draw of the actuator measured during the operating function at the second velocity with the current draw of the actuator measured during the initializing function at the second velocity by the amount of another predetermined current draw increment; and using the last mentioned comparison to determine when the actuator at the second velocity during the operating function achieves a specified condition.

10. The method as set forth in claim 6, wherein the adjusting includes adjusting the comparison by the amount of another predetermined current draw increment;

the other predetermined current draw increment is substantially equal to the difference between maximum and minimum current draw during actuating at the first predetermined velocity at a given temperature and a given duration time of actuator actuating.

11. The method as set forth in claim 1, wherein the actuating is actuator retracting, and the specified condition is fully retracted.

12. The method as set forth in claim 1, wherein the actuating is actuator extending, and the specified condition is ground contact.

13. The method as set forth in claim 1, wherein the actuating is actuator extending, and the specified condition is end of actuator extending stroke.

14. The method as set forth in claim 1, wherein the comparing and adjusting includes calculating a first adjusted reference actuating current draw based upon the measured current draw during the initializing function as adjusted based upon the temperature and actuation duration time existing when the initializing current draw is measured.

15. The method as set forth in claim 14, wherein the comparing and adjusting includes calculating a second adjusted reference actuating current draw based upon the first adjusted reference actuating current draw further adjusted based upon the temperature and actuation duration time existing when the operating current draw is measured.

* * * * *